US008761689B2

(12) United States Patent
Smadi (10) Patent No.: US 8,761,689 B2
(45) Date of Patent: Jun. 24, 2014

(54) METHODS AND APPARATUS FOR USE IN COMMUNICATING DATA WHICH INCLUDES THE SELECTION OF AN RF CHANNEL FOR COMMUNICATIONS

(75) Inventor: Mohammed Nawaf Smadi, Waterloo (CA)

(73) Assignee: BlackBerry Limited, Waterloo (CA)

( * ) Notice: Subject to any disclaimer, the term of this patent is extended or adjusted under 35 U.S.C. 154(b) by 565 days.

(21) Appl. No.: 12/833,160

(22) Filed: Jul. 9, 2010

(65) Prior Publication Data

US 2012/0009888 A1    Jan. 12, 2012

(51) Int. Cl.
*H04B 1/40* (2006.01)

(52) U.S. Cl.
USPC ......... 455/88; 455/63; 455/412.1; 455/533.1; 455/425; 455/522; 455/423; 455/440; 455/41; 455/521; 455/502; 370/342; 370/335; 370/350; 370/442; 370/457

(58) Field of Classification Search
CPC ............ H04B 7/00; H04B 1/00; H04W 52/46
USPC ............... 455/88, 63, 412.1, 533.1, 425, 522, 455/423, 440, 413, 521, 502, 515, 432.1; 370/342, 335, 350, 520, 442, 450, 457, 370/351, 338
See application file for complete search history.

(56) References Cited

U.S. PATENT DOCUMENTS

| | | | |
|---|---|---|---|
| 5,542,120 A * | 7/1996 | Smith et al. .................... | 455/425 |
| 6,377,608 B1 * | 4/2002 | Zyren ........................... | 375/132 |
| 6,463,271 B1 | 10/2002 | Schroeder et al. | |
| 6,483,814 B1 | 11/2002 | Hsu et al. | |
| 6,549,862 B1 | 4/2003 | Huang et al. | |
| 6,665,269 B1 | 12/2003 | Schmitz | |
| 6,754,484 B1 * | 6/2004 | Hiltunen et al. ........... | 455/412.1 |
| 6,920,171 B2 * | 7/2005 | Souissi et al. ................. | 375/133 |
| 7,079,812 B2 * | 7/2006 | Miller et al. ................. | 455/63.1 |
| 7,221,904 B1 | 5/2007 | Gavrilovich | |
| 7,676,198 B2 * | 3/2010 | Mahany .......................... | 455/69 |
| 8,055,256 B2 | 11/2011 | Rudowicz et al. | |
| 8,090,395 B2 | 1/2012 | Ngai et al. | |
| 2003/0012163 A1 | 1/2003 | Cafarelli et al. | |

(Continued)

OTHER PUBLICATIONS

European Search Report & Written Opinion for EP application # 10169054.3, Dec. 14, 2010.

(Continued)

*Primary Examiner* — Ganiyu A Hanidu
(74) *Attorney, Agent, or Firm* — Ridout & Maybee LLP (57) ABSTRACT

A mobile communication device includes a first radio frequency (RF) transceiver and a second RF transceiver. The first RF transceiver is operative for communications in accordance with a first radio protocol (e.g. BLUETOOTH®) using a first set of RF channels, and the second RF transceiver is operative for communications in accordance with a second radio protocol (e.g. IEEE 802.11) using a second set of RF channels. The mobile device identifies a list of noisy RF channels in the first set of RF channels, detected through operation of the first RF transceiver in accordance with the first radio protocol. The mobile device selects one of the RF channels from the second set based on the identified list of noisy RF channels. The mobile device then controls operation of the second RF transceiver in accordance with the second radio protocol for communicating data to another communication device over the selected RF channel of the second set.

20 Claims, 8 Drawing Sheets

(56) References Cited

U.S. PATENT DOCUMENTS

| | | | |
|---|---|---|---|
| 2005/0215197 | A1 | 9/2005 | Chen et al. |
| 2007/0183338 | A1* | 8/2007 | Singh et al. .................. 370/252 |
| 2008/0212649 | A1 | 9/2008 | Jougit |
| 2008/0318571 | A1* | 12/2008 | Vikberg et al. .............. 455/63.1 |
| 2009/0257396 | A1* | 10/2009 | Eliezer et al. ................. 370/330 |
| 2010/0029325 | A1* | 2/2010 | Wang et al. ................ 455/553.1 |
| 2010/0309831 | A1* | 12/2010 | Yeh et al. ...................... 370/311 |
| 2011/0237253 | A1* | 9/2011 | Hallenstal et al. ......... 455/435.1 |

OTHER PUBLICATIONS

Mah-Rukh Fida, "Solutions to the WLAN & Bluetooth Interference", Fifth International Conference on Information Technology: New Generations, Apr. 7, 2009, pp. 1140-1141, XP-31244471.

Timmers et al., "Exploring vs Exploiting: Enhanced Distributed Cognitive Coexistence of 802.15.4 With 802.11", IEEE Sensors 2008 Conference, Oct. 26, 2008, pp. 613-616, XP-31375153.

Hauer et al., "Experimental Study of the Impact of WLAN Interference on IEEE 802.15.4 Body Area Networks", Oct. 11, 2009, pp. 17-32, XP-19114809, Berlin.

Lee et al., "Adaptive Frequency Hopping for Bluetooth Robust to WLAN Interference", IEEE Communications Letters, Sep. 9, 2009, pp. 628-630, vol. 13, No. 9.

Pang et al., "Channel Clustering and Probabilistic Channel Visiting Techniques for WLAN Interference Mitigation in Bluetooth Devices", IEEE Transactions on Electromagnetic Compatibility, Nov. 2007, pp. 914-923, vol. 49, Issue 4.

Mah-Rukh Fida, "Solutions to the WLAN & Bluetooth Interference", 5th International Conference on Information Technology, Apr. 7, 2009, pp. 1140-1141.

* cited by examiner

FIG. 8

METHODS AND APPARATUS FOR USE IN COMMUNICATING DATA WHICH INCLUDES THE SELECTION OF AN RF CHANNEL FOR COMMUNICATIONS

BACKGROUND

1. Field of the Technology

The present disclosure relates generally to radio communications, and more particularly to techniques for communicating data which include the selection of an RF channel for communications.

2. Description of the Related Art

Mobile communication devices configured to operate in accordance with IEEE 802.11 standards or the like may communicate in wireless local area networks (WLANs). It is desirable for such mobile devices to be able to communicate one or more files, such as one or more documents, images, or video files, etc., to/from other communication devices.

Today, such mobile devices may be configured to enter into an access point (AP) mode of operation, so that other communication devices may associate with them for direct communications therebetween. This AP mode of operation, which may be referred to as a "Micro-AP mode", provides a benefit due to the high data rates available over WLAN links. This mode is intended to replace the "ad-hoc mode" offered by the IEEE 802.11 standard.

Unfortunately, the Micro-AP mode results in relatively higher power consumption from use of the WLAN radio and its associated host activities, even during idle state. To offset this negative tradeoff, there are initiatives which plan on using a co-located, low-power, radio operative in accordance with BLUETOOTH® standards. BLUETOOTH® is a registered trademark of Bluetooth SIG, Inc. Examples of such initiatives include standards which include IEEE 802.11 CLPP and IEEE 802.11 AMP. The WLAN connection and its parameters would be negotiated between the mobile devices over the BLUETOOTH® radio prior to powering up the WLAN radio.

However, the interference resulting from Micro AP mode may have a negative impact on existing WLAN deployments. It would be desirable to choose an operational frequency of the Micro AP such that the added interference to the existing deployment is minimized. Deciding the minimum interference operational frequency by performing WLAN scanning may significantly increase power consumption. Further, the concurrent BLUETOOTH® connection may be terminated due to co-channel interference resulting from WLAN radio scanning, which in many cases is performed as an atomic operation.

BRIEF DESCRIPTION OF THE DRAWINGS

Embodiments of present invention will now be described by way of example with reference to attached figures, wherein.

DETAILED DESCRIPTION OF THE PREFERRED EMBODIMENTS

Methods and apparatus for use in communicating data are described herein. A mobile communication device includes a first radio frequency (RF) transceiver and a second RF transceiver. The first RF transceiver is operative for communications in accordance with a first radio protocol (e.g. BLUETOOTH®) using a first set of RF channels, and the second RF transceiver is operative for communications in accordance with a second radio protocol (e.g. IEEE 802.11) using a second set of RF channels. The mobile device identifies a list of noisy RF channels in the first set of RF channels, detected through operation of the first RF transceiver in accordance with the first radio protocol. The mobile device selects one of the RF channels from the second set based on the identified list of noisy RF channels. The mobile device then controls operation of the second RF transceiver in accordance with the second radio protocol for communicating data to another communication device over the selected RF channel of the second set.

Figure 1:
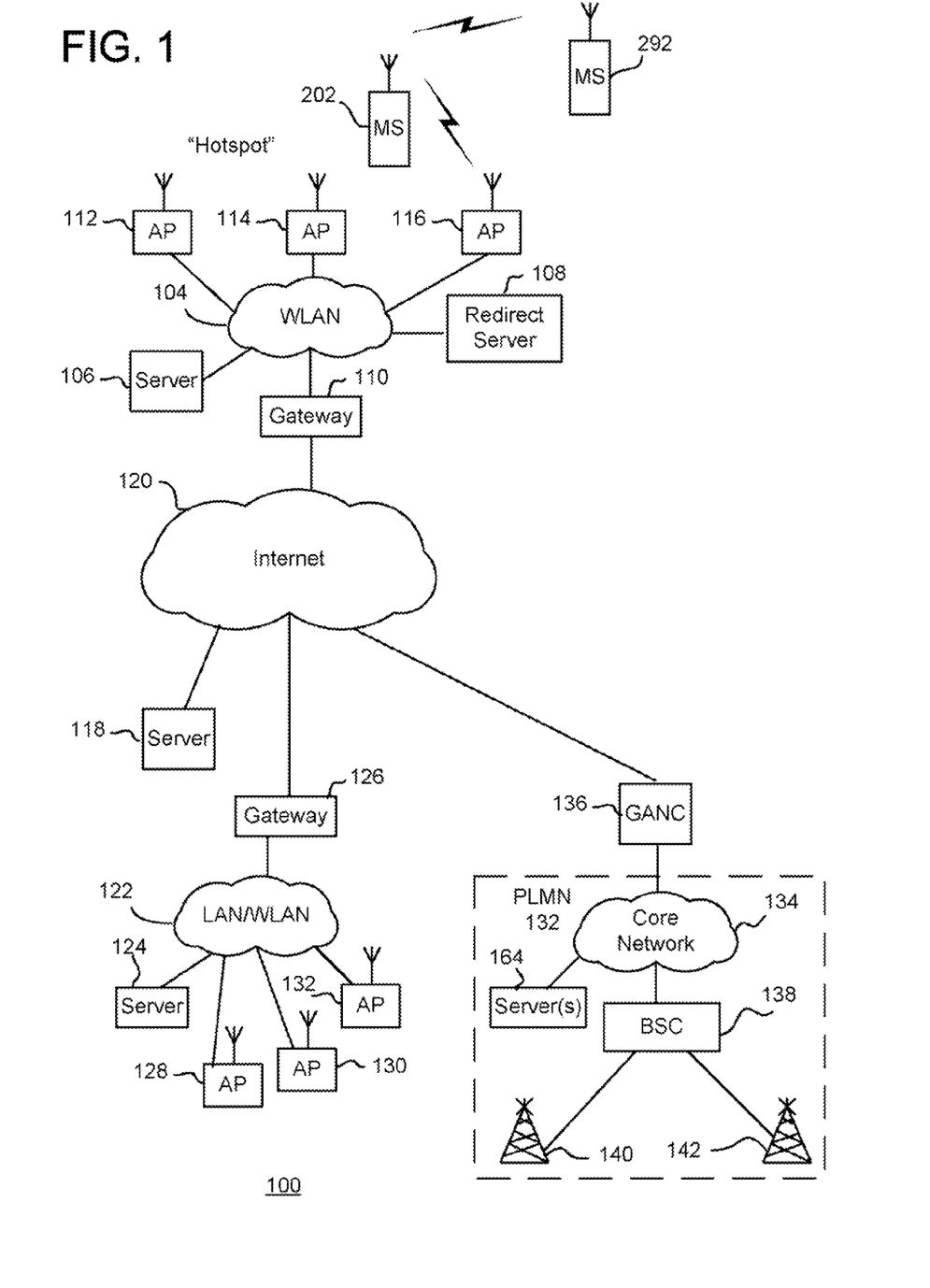
FIG. 1 is an illustrative representation of a communication system which includes a wireless communication network within which a communication device may operate.

To illustrate one exemplary network architecture within which, the techniques of the present disclosure may be practiced, FIG. 1 is a communication system 100 which includes a wireless local area network (WLAN) 104 within which a mobile communication device 202 may operate. WLAN 104 has a plurality of wireless access points (APs) 112, 114, and 116 for wireless communications with mobile device 202. In the present embodiment, WLAN 104 and mobile device 202 operate in accordance with IEEE 802.11 standards. Such WLANs are identifiable by a mobile device 202 from a Set Service Identifier (SSID) or Extended SSID (ESSID). WLAN 104 also includes one or more servers 106, a redirect server 108, and a gateway 110. Server 106 may provide data, applications, and/or functionality for communication services in WLAN 104.

Mobile device 202 may also operate for communications in different LANs/WLANs, such as WLAN 122. Similar to WLAN 104, WLAN 122 has a plurality of wireless APs 128, 130 and 132, one or more servers 124, and a gateway 126. In this embodiment, WLAN 122 is a private communication network of an enterprise (small company, corporation, etc.) associated with mobile device 202. Such WLANs 104 and 122 may provide or allow access to various data and communication services to its terminals. For example, the WLANs may provide for access to Internet 120 via the Web browser application, or voice telephony communication services with use of Voice over IP (VoIP) communications or other techniques.

For "push-type" data or message synchronization services, mobile device 202 is enabled to maintain data synchronization with a server (e.g. server 106 or 118) for user data of an application associated with a user account. The application of mobile device 202 and the server may be or include, for example, an electronic mail (e-mail) application program for the communication of e-mail messages. In this case, the data synchronization is a message synchronization for the e-mail messages associated with the user account for an e-mail application program. The data synchronization may alternatively or additionally be or include an address book synchronization for address book contacts in an address book organizer, or a calendar appointment synchronization for calendar appointments in a calendar application program. These and other applications of mobile device 202 are also identified later in relation to FIG. 5. For the data-synchronized communications, the server maintains storage of a mapping of a user account name or identifier of the user account with a personal identification number of mobile device 202. When communications are required with mobile device 202, the personal identification number is used to route the messages to/from mobile device 202 through communication system 100.

In contrast to WLAN 122, WLAN 104 may be a public WiFi "hotspot" for public use and include what is referred to as a "captive portal" or "walled garden." For devices connected in WLAN 104 via one of wireless APs 112, 114, and 116, gateway 110 is configured to permit or deny access to the data, applications, and/or functionality, as well as to permit or deny external access outside of WLAN 104 to Internet 120. To do this, gateway 110 has a set of IP address filters which define a set of addresses that are permissible/impermissible, if any at all, for access by devices. Access by a device depends on whether or not a device has been authorized and what access rights are given upon authorization.

Typically, when a request by a device in WLAN 104 is made prior to proper authorization, gateway 110 is configured to redirect the request to redirect server 108. In response, redirect server 108 is configured to respond to mobile device 202 to provide data for producing information (e.g. a Web page information) which is rendered in a visual display of mobile device 202 via a Web browser application. The information may solicit a user response. For example, the information may solicit a user registration or login with user fields for entering a user name and/or password information. As another example, the information may solicit a user payment with user payment fields for entering in user payment information. Further, the information may solicit a user acceptance of terms of use, a license, or a legal disclaimer (options of "YES" or "NO", or "ACCEPT" or "DECLINE"). Redirect server 108 may be referred to by a different name depending on any more specific purpose (e.g. authentication server, registration server, user confirmation server, etc.).

The user will enter a user response via the Web browser application, for example, which is sent by mobile device 202 and received by gateway 110. Gateway 110 identifies whether the received user response is sufficient (e.g. whether the user name and password match prestored user name and password information, whether the user payment is accepted, whether the user acceptance is confirmed, etc.). If the user response is deemed sufficient, gateway 110 permits access to the data, applications, and/or functionality in or outside of WLAN 104.

Again, in contrast to WLAN 104, WLAN 122 may be a private communication network of an enterprise associated with mobile device 202. For devices attempting to access WLAN 122 via Internet 120, gateway 126 is configured to permit or deny internal access to the data, applications, and/or functionality in WLAN 122. For devices connected in WLAN 122 via one of wireless APs 128, 130, and 132, gateway 126 may be configured to permit or deny access to the data, applications, and/or functionality offered via WLAN 122 depending on whether or not a device has been authorized and what access rights are given upon authorization.

Communication may also be configured in accordance with Generic Access Network (GAN) technologies. Using GAN based technologies, mobile device 202 may also access communication services from a core network 134 of a Public Land Mobile Network (PLMN) 132 (e.g. cellular). GAN technology may provide, amongst other things, a voice communication service for mobile device 202 via the WLAN hotspot. PLMN 132 includes a core network 136, a plurality of base station controllers such as a base station controller (BSC) 138 coupled to core network 136, and a plurality of base stations such as a base station (BS) 140 and a base station 142 coupled to associated BSCs 138. Core network 136, BSC 138, and BS 140 operate in a conventional fashion as well-documented. Other PLMNs in the environment have a similar or the same architecture as PLMN 132. Such environments may be referred to as cellular telecommunications networks.

Communications between WLAN 104 and core network 134 of PLMN 132 may be facilitated through a suitable connecting network such as a broadband, wide-area IP communication network (e.g. the Internet 120) or any suitable public or private wide area network. Gateway/controller or GAN controller (GANC) 136 is provided between the Internet 120 and core network 134 of PLMN 132 in order to facilitate access to core network 134 by terminals through alternative links (e.g. radio links wireless APs 112, 114, and 116) different than those conventional radio links offered in the PLMN 132 (e.g. radio links of base stations 140 and 142). Thus, mobile device 202 may also access services of core network 134 of PLMN 132 via WLANs, such as WLAN 104, through use of a WLAN radio interface as opposed to a cellular telephony interface. For such communications, GANC 136 and mobile device 202 are adapted to establish and maintain a (secure) tunnel connection between each other through the intervening networks. Note that WLAN 104 may be operator-controlled or provided (e.g. controlled or provided by the operator associated with PLMN 132), user-controlled or provided (e.g. controlled or provided by the end user of mobile device 202), or third-party-controlled or provided.

Again, GANC 136 operates in accordance with GAN based technology (formerly known as Unlicensed Mobile Access (UMA), and may be or include GANC 136 (formerly known as UMA Network Controller or UNC) or the like. In this case, terminals including mobile device 202 are enabled with GAN technology for operating in a GAN mode of operation. GAN methodologies are known and described in publicly available documentation. Mobile device 202 with GAN-enabled, dual-mode operation may be within operating range of WLAN 104 for communications. Upon connecting, mobile device 202 contacts GANC 136, via WLAN 104 and the Internet 120, to be authenticated and authorized to access voice and data communication services of core network of PLMN 132. If approved, the subscriber's current location information is stored in core network 134 of PLMN 132 and, from that point on, all voice and data traffic for mobile device 202 is routed to the device via WLAN 104, in contrast to a radio access network (RAN) of PLMN 132 which includes BSC 138 and BSs 140 and 142. In this state, mobile device 202 is operating in a GAN mode of operation. When a call is established for mobile device 202 while operating within WLAN 104, the call connection for the call is routed within core network 134 but RF resources of WLAN 104 are utilized.

Today, mobile device 202 may be further configured to enter into an access point (AP) mode of operation, so that other communication devices (such as a mobile device 292 of FIG. 1) may associate with them for direct RF communications therebetween. This AP mode of operation, which may be referred to as a "Micro-AP mode", provides a benefit due to the high data rates available over WLAN links. For this purpose, the devices may operate in accordance with IEEE 802.11 CLPP (Configuration and Low Power Profile) and/or IEEE 802.11 AMP (Alternate MAC/PHY) standards. Here, again, the data may be communicated directly between the mobile devices 202 and 292 without the data traversing any wireless network infrastructure, where one of the mobile devices is set to operate or serve as an access point (AP) (switching operation from as an end terminal) and the other communication device operates as an end terminal to associate and connect with the AP (i.e. the mobile device operating as an AP) for communications. It is possible that when mobile device 202 operates in the AP mode, it may also operate as a client with another AP.

Figure 2:
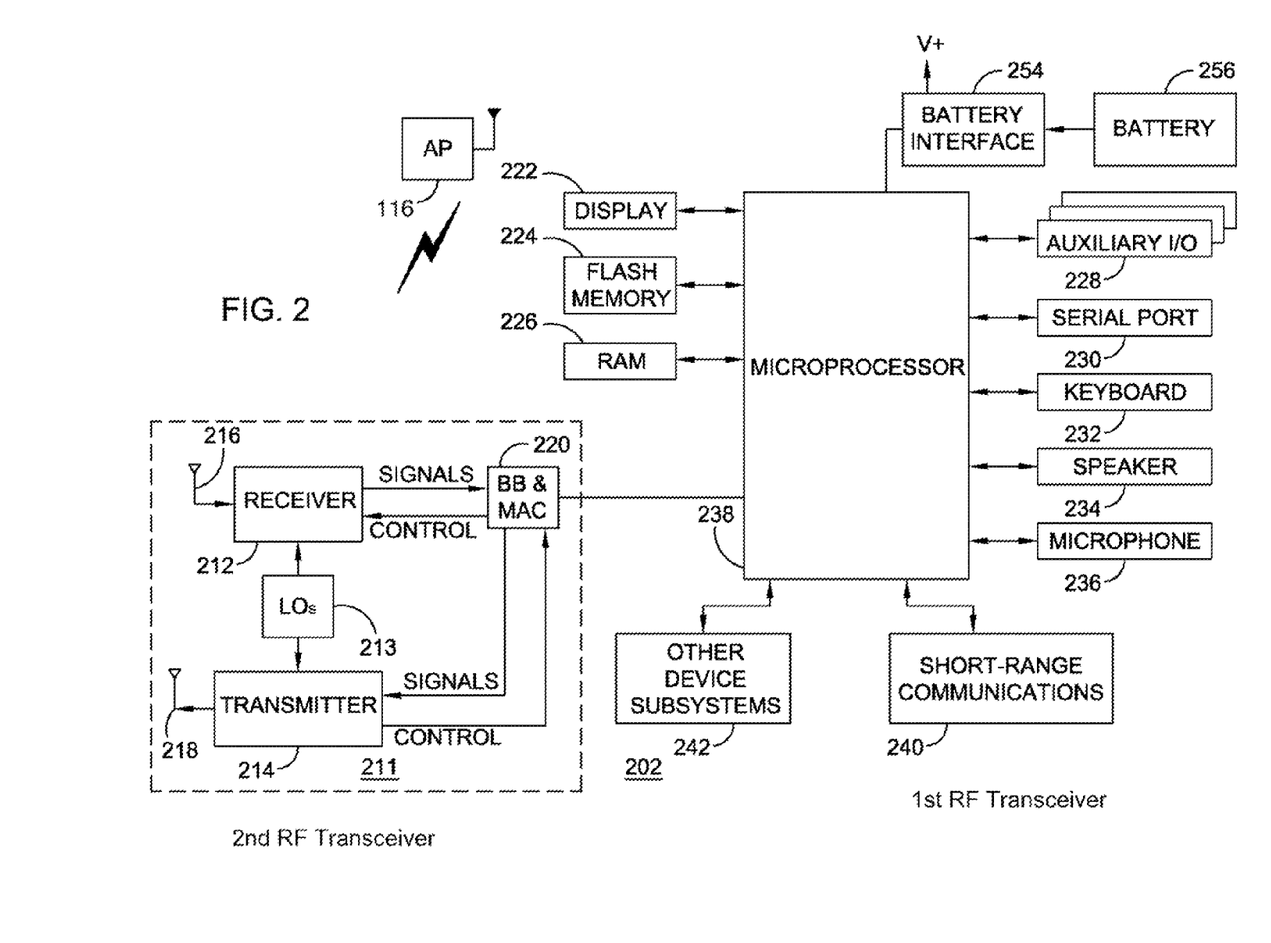
FIG. 2 is a schematic block diagram of a mobile communication device operative in a WLAN.

Referring now to FIG. 2, electrical components of a typical mobile communication device 202 (e.g. a mobile station, mobile terminal, or user equipment "UE", or the like) which operates with wireless APs of communication system 100 of FIG. 1 will be described. Mobile device 202 may be representative of one or more terminals shown and described in relation to FIG. 1. Mobile device 202 may be a two-way communication device having at least voice and/or advanced data communication capabilities, including the capability to communicate with other computer systems. Also, mobile device 202 may be a wireless communication device which operates in accordance with an IEEE 802.11 standards. Depending on the functionality provided by mobile device 202, it may be referred to as a data messaging device, a two-way pager, a cellular-type telephone with data messaging capabilities, a wireless Internet appliance, or a data communication device (with or without telephony capabilities).

As shown in FIG. 2, mobile device 202 is adapted to wirelessly communicate with wireless APs of WLANs, such as AP 116 of WLAN 104 of FIG. 1. For communication with AP 116, mobile device 202 utilizes a communication subsystem 211. Depending on the type of device, mobile device 202 may also be adapted to wirelessly communicate with other systems such as cellular telecommunication systems. With such configuration, mobile device 202 may be referred to as a "dual mode" mobile device. Although mobile device 202 may have separate and independent subsystems for these purposes, at least some portions or components of these otherwise different subsystems may be shared where possible.

Communication subsystem 211 includes a receiver 212, a transmitter 214, and associated components, such as one or more (e.g. embedded or internal) antenna elements 216 and 218, local oscillators (LOs) 213, and a processing module such as a baseband (BB) and media access control (MAC) processing module 220. Communication subsystem may be or referred to as a radio frequency (RF) transceiver or wireless transceiver. As will be apparent to those skilled in the field of communications, the particular design of communication subsystem 211 depends on the communication network in which mobile device 202 is intended to operate. In the present disclosure, communication subsystem 211 (including its associated processor/processing components) are operative in accordance with IEEE 802.11 standards.

Mobile device 202 may send and receive communication signals through the network after required network procedures have been completed. Signals received by antenna 216 through the network are input to receiver 212, which may perform such common receiver functions as signal amplification, frequency down conversion, filtering, channel selection, and like, and in example shown in FIG. 2, analog-to-digital (A/D) conversion. A/D conversion of a received signal allows more complex communication functions such as demodulation and decoding to be performed in BB/MAC processing module 220. In a similar manner, signals to be transmitted are processed, including modulation and encoding, for example, by BB/MAC processing module 220. These processed signals are input to transmitter 214 for digital-to-analog (D/A) conversion, frequency up conversion, filtering, amplification and transmission through the network via antenna 218. BB/MAC processing module 220 not only processes communication signals, but may also provide for receiver and transmitter control. Note that receiver 212 and transmitter 214 may share one or more antennas through an antenna switch (not shown in FIG. 2), instead of having two separate dedicated antennas 216 and 218 as shown.

Since mobile device 202 may be a handheld portable battery-powered device, it also includes a battery interface 254 for receiving one or more rechargeable batteries 256. Such a battery 256 provides electrical power to most if not all electrical circuitry in mobile device 202, and battery interface 254 provides for a mechanical and electrical connection for it. Battery interface 254 is coupled to a regulator (not shown in FIG. 2) that provides a regulated voltage V to all of the circuitry.

Mobile device 202 includes a microprocessor 238 (one type of processor or controller) that controls overall operation of mobile device 202. This control includes the communication techniques of the present disclosure. Communication functions, including at least data and voice communications, are performed through communication subsystem 211. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Keyboard 232 may be a complete alphanumeric keyboard and/or telephone-type keypad. On the other hand, keyboard 232 and display 222 may be replaced or enhanced with a touch screen display or other suitable input mechanism, or replaced or enhanced with a voice-activated input module.

Operating system software used by microprocessor 238 may be stored in a persistent store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226. Microprocessor 238, in addition to its operating system functions, enables execution of software applications on mobile device 202. A predetermined set of applications that control basic device operations, including data and/or voice communication applications, will normally be installed on mobile device 202 during its manufacture. This includes applications or modules which are configured to perform the network selection techniques of the present disclosure. For this reason, microprocessor 238 (and any other processor(s) or modules of mobile device 202) may enable execution of particular applications or modules for performing enhanced network selection techniques for access to multiple aggregator services.

Another application that may be loaded onto mobile device 202 may be a personal information manager (PIM) application having the ability to organize and manage data items relating to user such as, but not limited to, e-mail, calendar events, voice mails, appointments, and task items. The PIM application has the ability to send and receive data items via the wireless network. In one embodiment, PIM data items are seamlessly integrated, synchronized, and updated via the wireless network, with the wireless device user's corresponding data items stored and/or associated with a host computer system thereby creating a mirrored host computer on mobile device 202 with respect to such items. This is especially advantageous where the host computer system is the wireless device user's office computer system. Additional applications may also be loaded onto mobile device 202 through network, an auxiliary. I/O subsystem 228, serial port 230, short-range communications subsystem 240, or any other suitable subsystem 242, and installed by a user in RAM 226 or a non-volatile store (not shown) for execution by microprocessor 238. Such flexibility in application installation increases the functionality of mobile device 202 and may provide enhanced on-device functions, communication-related functions, or both. For example, secure communication applications may enable electronic commerce functions and other such financial transactions to be performed using mobile device 202.

In a data communication mode, a received signal such as a text message, an e-mail message, or web page download will be processed by communication subsystem 211 and input to microprocessor 238. Microprocessor 238 may further process the signal for output to display 222 or alternatively to auxiliary I/O device 228. A user of mobile device 202 may also compose data items, for example, using keyboard 232 in conjunction with display 222 and possibly auxiliary I/O device 228. In accordance with the present techniques, microprocessor 238 may process outgoing message requests and incoming responses described later in relation to FIGS. 3A-3B, whether or not such processing is part of the Web browser application. The composed items may be transmitted over a communication network through communication subsystem 211.

For voice communications, the overall operation of mobile device 202 is substantially similar, except that the received signals would be output to speaker 234 and signals for transmission would be generated by microphone 236. Alternative voice or audio I/O subsystems, such as a voice message recording subsystem, may also be implemented on mobile device 202. Although voice or audio signal output may be accomplished primarily through speaker 234, display 222 may also be used to provide an indication of the identity of a calling party, duration of a voice call, or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of mobile device 202 by providing for information or software downloads to mobile device 202 other than through a wireless communication network. The alternate download path may, for example, be used to load an encryption key onto mobile device 202 through a direct and thus reliable and trusted connection to thereby provide secure device communication.

Short-range communications subsystem 240 of FIG. 2 is an additional component that provides for communication between mobile device 202 and different systems or devices, which need not necessarily be similar devices. In this embodiment, communication subsystem 240 is a BLUETOOTH® communication module to provide for communication with similarly enabled systems and devices. Note that the BLUETOOTH® standards may be defined by or based on BLUETOOTH® Specification Version 2.0, Volumes 1 and 2, for example.

Note that, in the specific embodiment of the present disclosure, communication subsystem 240 may be deemed to be the first RF transceiver which utilizes the first set of RF channels, and communication subsystem 211 may be deemed to be the second RF transceiver which utilizes the second set of RF channels, operation which is described in more detail later in relation to FIG. 3 and FIGS. 6-8.

Figure 3:
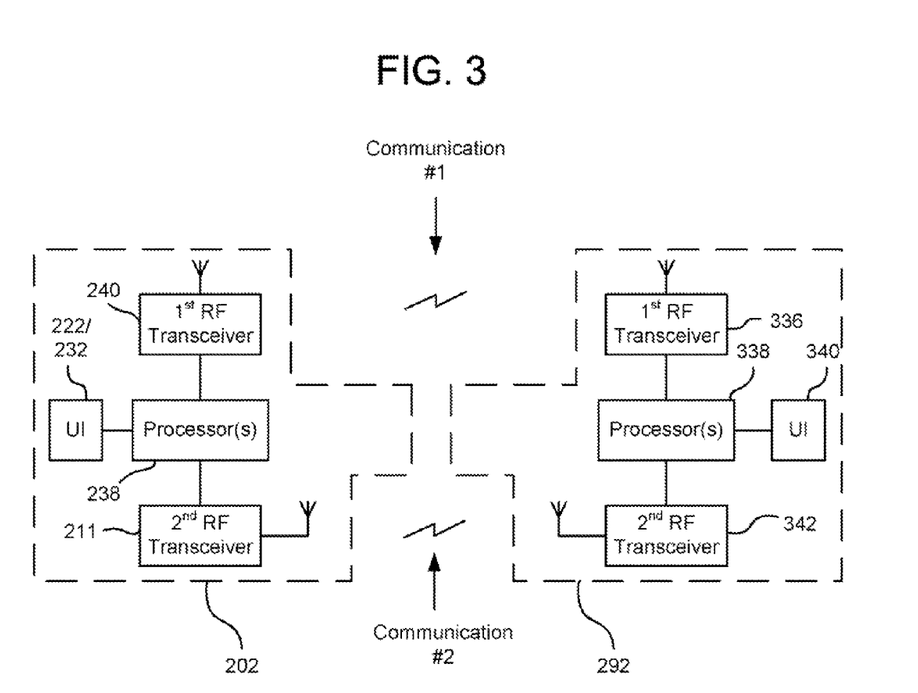
FIG. 3 is an illustration of the general components or modules which may be utilized in the method for use in communicating data in accordance with the present disclosure.

FIG. 3 is a more generalized view of pertinent components of the mobile devices 202 and 292 of FIGS. 1-2, illustrating that mobile devices 202 and 292 are operative to communicate data therebetween. In general, mobile device 202 includes one or more processors 238, a user interface 222/232 coupled to the one or more processors 238, a first RF transceiver 240 operative in accordance with a first radio protocol (e.g. BLUETOOTH® communication protocol), and a second RF transceiver 211 operative in accordance with a second radio protocol (e.g. IEEE 802.11 communication protocol). As apparent, first and second RF transceivers 240 and 211 are collocated in mobile device 202 with the one or more processors 238 (e.g. within the same housing unit of mobile device 202). Mobile device 292 is similar in make and construction as mobile device 202. Mobile device 292 includes one or more processors 338, a user interface 340 coupled to the one or more processors 338, a first RF transceiver 336 operative in accordance with the first radio protocol (e.g. BLUETOOTH® communication protocol), and a second RF transceiver 342 operative in accordance with the second radio protocol (e.g. IEEE 802.11 communication protocol). Again, first and second RF transceivers 336 and 342 are collocated in mobile device 292 with the one or more processors 338 (e.g. within the same housing unit of mobile device 292).

With the exemplary configuration in FIG. 3, data may be communicated directly between mobile devices 202 and 292 without the data traversing any wireless network infrastructure. In this case, mobile device 202 may be set to operate or serve as an access point (AP) (switching operation from as an end terminal) and mobile device 292 may operate as an end terminal to associate and connect with the AP (i.e. mobile device 202 operating in the AP mode) for communications. The setup of communications may occur using first RF transceivers 240 and 336 in accordance with the first radio protocol, whereas the subsequent communication of data may occur using second RF transceivers 211 and 342 in accordance with the second radio protocol.

Figure 4:
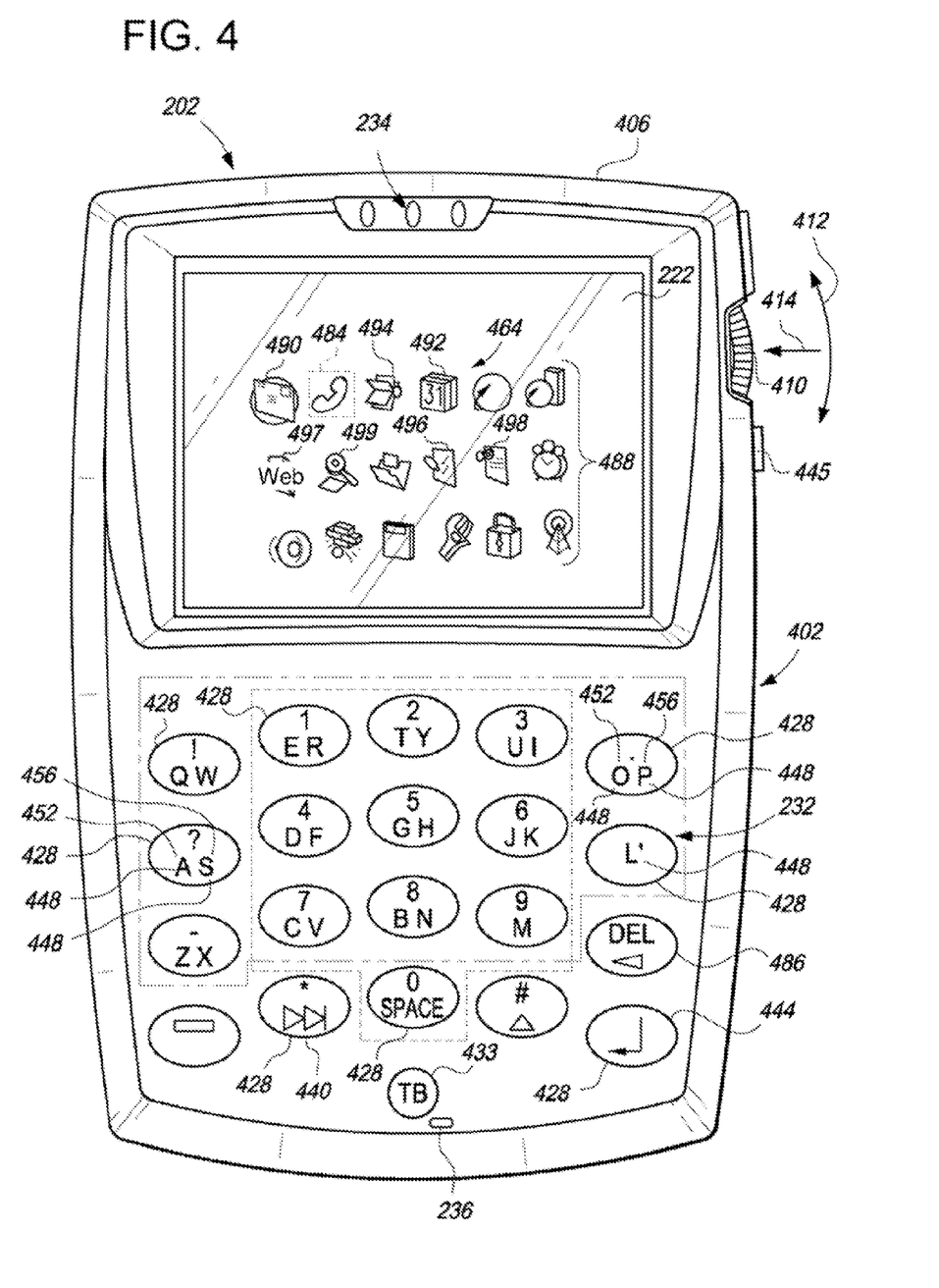
FIG. 4 is an illustrative example of an exemplary user interface of the mobile communication device of FIGS. 1 and 2.

FIG. 4 is an illustrative representation of an exemplary user interface 402 of a communication device (mobile device 202 of FIGS. 1 and 2). Mobile device 202 includes at least display 222, keyboard 232, speaker 234, microphone 236, and a cursor or view positioning mechanism such as a positioning wheel 410 (e.g. a scrollwheel) or a trackball 433. Although shown enlarged in FIG. 4 for clarity, this mobile communication device 202 is sized to be a handheld portable device. As an alternative to or in addition to positioning wheel 410 and/or trackball 433, a wide range of one or more pointing or cursor/view positioning mechanisms such as a touch pad, a track pad, a joystick button, a mouse, a touchscreen, a tablet, or other whether presently known or unknown, may be employed. The cursor may be or include a pointer, a movable item or other visual cue used to mark a position or point to another item on a display, in order to, for example, indicate position for data entry or for selection of the other item.

Keys 428 of keyboard 232 are disposed on a front face of a housing 406 and positioning wheel 410 is disposed at a side of housing 406. Keyboard 232 is in the example form of a reduced QWERTY keyboard including a plurality of keys 428 that serve as input members. It can be seen that the arrangement of the characters 448 on keys 428 of keyboard 424 is generally of the QWERTY arrangement, albeit with many of keys 428 including two of characters 448. In the example depiction of keyboard 424, many of keys 428 include two characters, such as including a first character 452 and a second character 456 assigned thereto. Characters may include letters, digits, symbols and the like and can additionally include ideographic characters, components thereof, and the like. One of keys 428 of keyboard 424 includes as the characters 448 thereof the letters "Q" and "W", and an adjacent key 428 includes as the characters 448 thereof the letters "E" and "R". Keyboard 424 may be of other configurations, such as an AZERTY keyboard, a QWERTZ keyboard, a Dvorak keyboard, or other keyboard or keypad arrangement, and either reduced or not reduced (i.e. full). In a "full" or non-reduced keyboard or keypad arrangement, each key has a single letter (not multiple letters) of the alphabet assigned to it.

Among keys 428 of keyboard 232 are a <NEXT> key 440 and an <ENTER> key 444. The <NEXT> key 440, wherein, for example, "<NEXT>" may be a symbol or may be the word "next" provided (e.g. printed) on the key, may be pressed to provide a selection input to the processor and provides substantially the same selection input as is provided by a rotational input of positioning wheel 410. Since <NEXT> key 440 is provided adjacent a number of other keys 428 of keyboard 232, the user can provide a selection input to the processor substantially without moving the user's hands away from the keyboard 232 during a text entry operation. Another key, the <ESC> key 445 is disposed on the side of housing 406 adjacent positioning wheel 438, although the same or similar key may be disposed as part of keyboard 232. Among keys 428 of the keyboard 424 additionally is a <DEL> key 486 that can be provided to delete a text entry.

Positioning wheel 410 may serve as another input member and is both rotatable; as is indicated by an arrow 412, to provide selection inputs to the processor, and also can be pressed in a direction generally toward housing 406, as is indicated by an arrow 414 to provide another selection input to the processor.

Display 222 may include a cursor 484 that depicts generally where the next input or selection from user interface 402 will be received. Display 222 is shown in FIG. 4 as displaying a home screen that represents a number of applications 586 (FIG. 3 shows some of the example possible applications 86) depicted as corresponding discrete icons 488. Icons 488 include, for example, an Electronic Mail (E-Mail) icon 490, a Calendar icon 492, an Address Book icon 494, a Tasks icon 496, a Messages icon 497, a MemoPad icon 498, and a Search icon 499, respectively.

Figure 5:
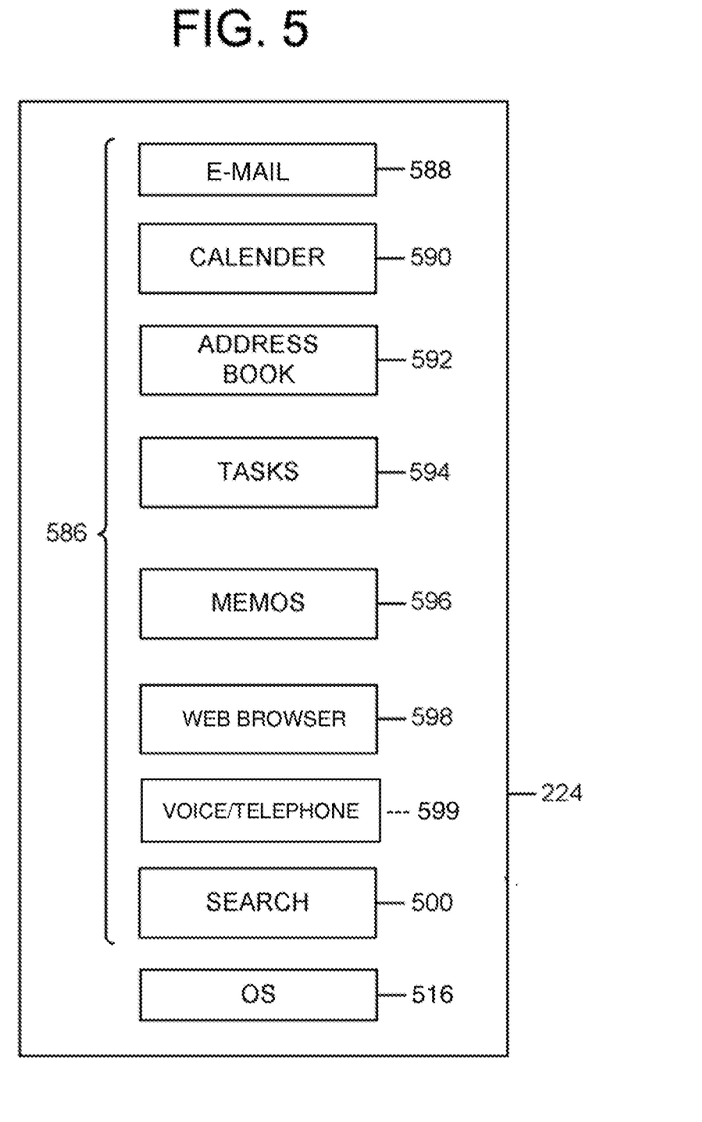
FIG. 5 is an illustrative representation of memory of the mobile communication device which includes a plurality of applications, many of which require some form of data communications.

As shown now further in FIG. 5, memory 224 of the mobile device includes a plurality of applications or routines 586 associated with the visually displayed icons 488 of FIG. 4 for the processing of data. Applications 586 may be in any of a variety of forms such as, without limitation, software, firmware, and the like. Applications 586 include, for example, an Electronic Mail (E-Mail) application 588 (FIG. 5) associated with E-mail icon 490 (FIG. 4), a Calendar application 590 (FIG. 5) associated with Calendar icon 492 (FIG. 4), an Address Book application 592 (FIG. 5) associated with Address Book icon 494 (FIG. 4), a Tasks application 594 (FIG. 5) associated with Tasks icon 496 (FIG. 4), a MemoPad (Memos) application 596 (FIG. 5) associated with MemoPad icon 498, a Web Browser application 598 (FIG. 5) associated with Web Browser icon 497 (FIG. 4), a Voice/Telephone application 599 (FIG. 5) associated with Voice/Telephone icon 484, and a Search application 500 (FIG. 5) associated with Search icon 499 (FIG. 4). An operating system (OS) program 516 also resides in memory 224.

The "home" screen output is shown in FIG. 4 as currently active and constitutes the main "ribbon" application for displaying the icons 488 shown. An application, such as E-mail application 588 of FIG. 5, may then be initiated (opened or viewed) from user interface 402 by providing a suitable user input to it. For example, E-mail application 588 may be initiated (opened or viewed) by rotating positioning wheel 410 to highlight E-mail icon 490 and providing a selection input by translating positioning wheel 410 in the direction indicated by arrow 438. As another example, display 222 displays icon 499 associated with Search application 500 and accepts input from positioning wheel 410 to initiate a search from that icon 499. Applications 586 may be additionally or alternatively initiated (opened or viewed) from user interface 402 by providing another suitable input to it, such as by suitably rotating or "rolling" trackball 433 and providing a selection input by, for example, pushing the trackball 433 (e.g. somewhat similar to positioning wheel 410 except into the plane of FIG. 4).

Movement, navigation, and/or scrolling with use of a cursor/view positioning mechanism is beneficial given the relatively large size of visually displayed information and the compact size of display 222 of FIG. 4, and since information and messages are typically only partially presented in the limited view of display 222 at any given moment. As previously described, positioning wheel 410 is one helpful cursor/view positioning mechanism to achieve such movement. Positioning wheel 410, which may be referred to as a scrollwheel, specifically includes a circular disc which is rotatable about a fixed axis of housing 302 and may be rotated by the end user's index finger or thumb. When the information or message is being partially displayed, an upwards rotation of positioning wheel 410 causes an upwards scrolling such that display 222 presents viewing of an upper portion of the information or message. Similarly, a downwards rotation of positioning wheel 410 causes a downwards scrolling such that display 222 presents viewing of a lower portion of the information or message. Positioning wheel 410 is mounted along a fixed linear axis such that the end user can depress positioning wheel 410 inwards toward housing 406 (e.g. with the end user's index finger or thumb) for selection of information. Again, see the direction indicated by an arrow 414 of positioning wheel 410 shown.

Although a specific mobile device 202 has just been described, any suitable mobile communication device or terminal may be part of the inventive methods and apparatus which will be described in fuller detail below. Note that many components of mobile device 202 shown and described may not be included (e.g. a full QWERTY keypad may be optional). Again, keyboard 232 and display 222 may be substituted or enhanced with a touch screen display or other suitable input mechanism, or enhanced or replaced with a voice-activated input module. Also, although the description of the architecture relates to a specific example for illustration, where the WLAN is an IEEE 802.11-based network, different environments may be applicable as well. The wireless network may be a WiMAX-based network (i.e. IEEE 802.16), or an Ultra-WideBand (UWB)-based network (i.e. IEEE 802.15), as a few examples.

Figure 7:
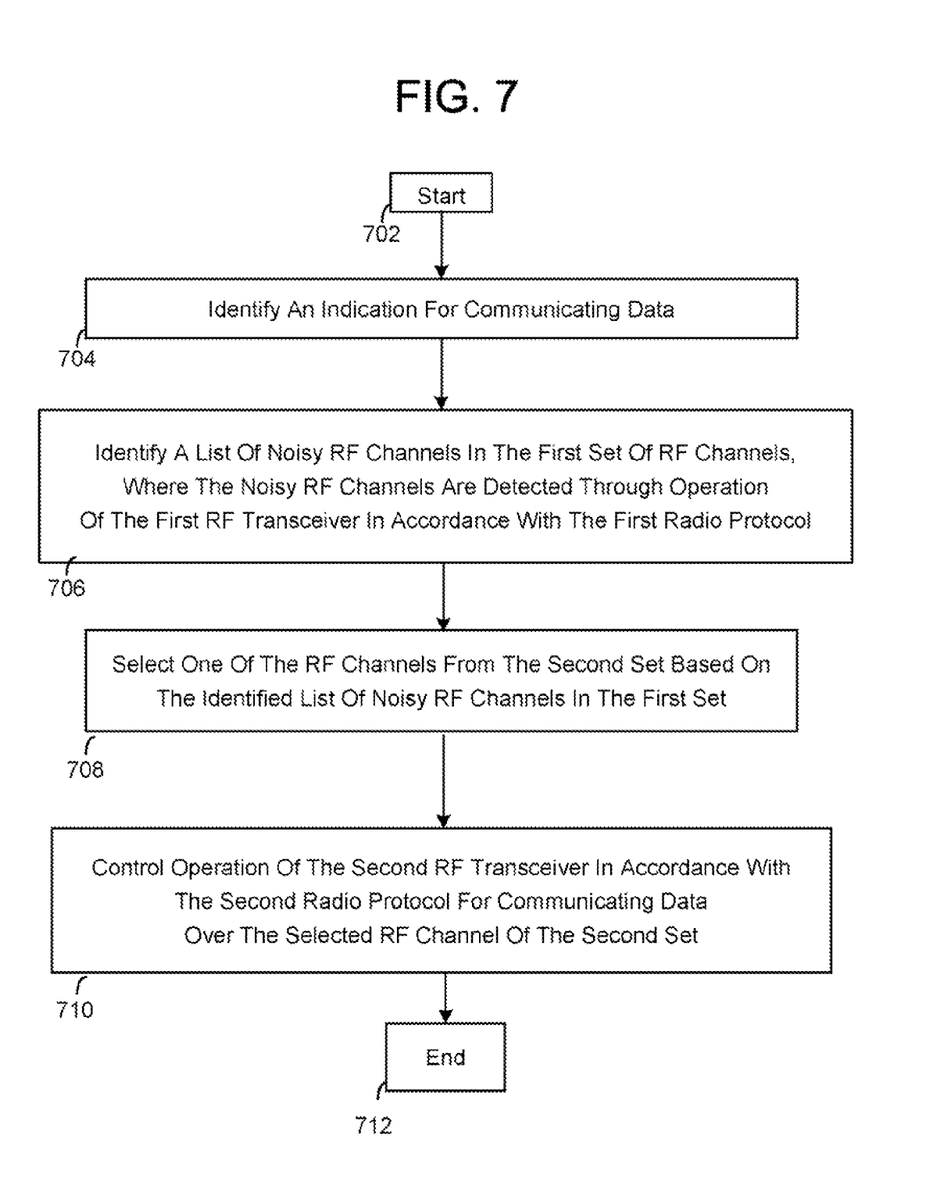
FIG. 7 is a flowchart of a method for use in communicating data, which includes a technique for selecting an RF channel for the communications.

Referring ahead now to FIG. 7, a flowchart of a method for use in communicating data is shown, which includes a technique for selecting an RF channel for communications. The communication device which employs the method is generally configured to operate as an end terminal in a wireless communication network; however, the communication device may switch operation to an access point (AP) mode if desired or necessary. Specifically, the method of FIG. 7 may be performed by mobile device 202 described in relation to FIGS. 1-5. In particular, the techniques described in relation to the flowchart may be performed by one or more controllers or processors of the communication device along with its wireless transceiver. A computer program product which may embody the technique may include a computer readable medium (e.g. memory of the communication device, computer disk, CD-ROM, etc.) having computer instructions stored therein which are executable by the one or more processors of the communication device for performing the technique.

As described earlier, the communication device in the method of FIG. 7 includes a first radio frequency (RF) transceiver and a second RF transceiver. The first RF transceiver is operative for communications in accordance with a first radio protocol using a first set of RF channels. On the other hand, the second RF transceiver is operative for communications in accordance with a second radio protocol using a second set of RF channels. The bandwidth of each RF channel of the first set may be different from (e.g. less than or greater than) the bandwidth of each RF channel of the second set. Put another way, for example, each RF channel of the second set may be overlapping with a plurality of (contiguous or non-contiguous) RF channels of the first set (or vice versa). The communication device may communicate with another communication device having the same or similar electrical components and operation (e.g. the first and second RF transceivers as described).

In the described embodiment, the communication devices and wireless networks generally operate in accordance with IEEE 802.11 and BLUETOOTH® standards for communications, as specified in IEEE 802.11 and BLUETOOTH® related standards. In this case, the first radio protocol is a BLUETOOTH® communication protocol and the second radio protocol is an IEEE 802.11 communication protocol. Further, the communication devices may further operate in accordance with IEEE 802.11 CLPP (Configuration and Low Power Profile) and/or IEEE 802.11 AMP (Alternate MAC/PHY) standards. In this case, the data may be communicated directly between the communication devices without the data traversing the wireless network infrastructure, where one of the communication devices is set to operate or serve as an access point (switching operation from as an end terminal) and the other communication device operates as an end terminal to associate and connect with the communication device for communications.

Figure 6:
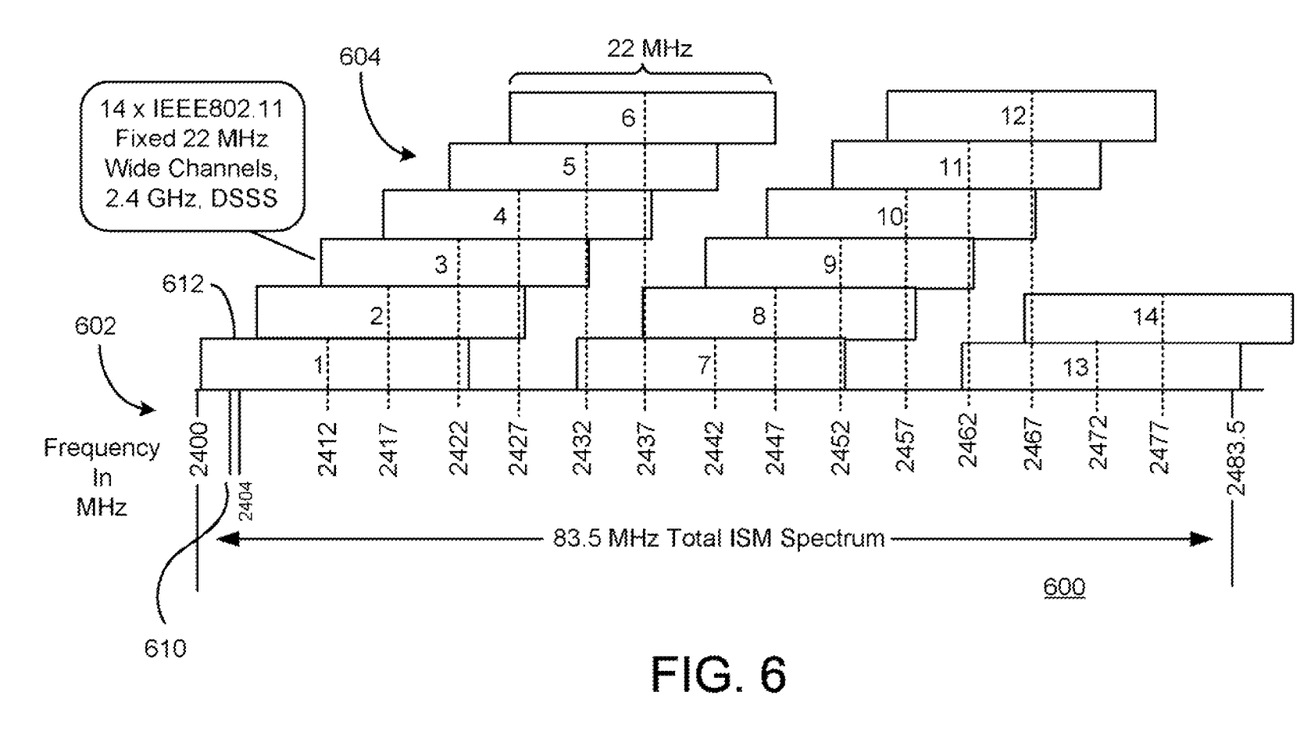
FIG. 6 is a graph of a radio frequency (RF) band wherein a first set of RF channels are utilized for a first radio protocol (e.g. BLUETOOTH® communication protocol) and a second set of RF channels are utilized for a second radio protocol (e.g. IEEE 802.11 communication protocol), where RF channels of the second set overlap with RF channels of the second set.

To better illustrate the detailed embodiment, a graph 600 in FIG. 6 is provided, revealing an RF band for RF communications. In FIG. 6, the RF band is specifically the 2.4 GigaHertz (GHz) band. The first radio protocol utilized is a BLUETOOTH® communication protocol which employs adaptive frequency hopping (AFH) using a plurality of RF channels 602. In BLUETOOTH®, there are eighty (80) RF channels, where each RF channel (e.g. RF channel 610 of FIG. 6) has a bandwidth of one (1) MegaHertz (MHz). On the other hand, the second radio protocol utilized is an IEEE 802.11 communication protocol which utilizes a plurality of RF channels 604. In IEEE 802.11, there are fourteen (14) fixed RF channels, where each RF channel (e.g. RF channel 612) has a bandwidth of twenty-two (22) MHz. As apparent, each IEEE 802.11 channel overlaps with exactly 22 specific BLUETOOTH® channels. In other environments or embodiments, a different number of RF channels may be overlapping.

Now referring back to FIG. 7, and beginning at a start block 702 of FIG. 7, the controller identifies an indication to initiate the communication of data (step 704 of FIG. 7). For example, the identified indication may correspond to (and/or be received in response to) a user input signal received via the user interface which indicates a desire to communicate the data. For example, the user input signal may indicate a desire for communicating one or more files, such as one or more documents, images, or video files, etc., to/from the communication device from/to another communication device. In this case, the indication to initiate the communication of data may include an identification of the data or file in the communication device to be communicated. On the other hand, for example, the identified indication may correspond to (and/or be received in response to) a signal or message received via the first RF transceiver which indicates a desire of the other communication device to communicate the data.

In response to identifying the indication, the communication device performs operations in preparation for communication of the data. For one, the communication device needs to select an RF channel of the second set to be utilized for the communication of the data with use of the second RF transceiver.

In the present technique, the controller determines which RF channel of the second set to select based on a list of noisy RF channels in the first set of RF channels which was produced using the first RF transceiver. The controller may receive or identify such information easily since it is collocated with and may control operation of the first RF transceiver. Accordingly, the controller receives and/or identifies this list of noisy RF channels in the first set of RF channels (step 706 of FIG. 7). Next, the controller selects one of the RF channels from the second set based on the identified list of noisy RF channels in the first set (step 708 of FIG. 7). The controller then Instructs or tunes the second RF transceiver to the selected RF channel. The controller controls operation of the second RF transceiver in accordance with the second radio protocol for communicating the data over the selected RF channel from the second set (step 710 of FIG. 7). The flowchart ends at an end block 712.

Note that the noisy RF channels in the first set of RF channels may have already been detected through (previous and/or ongoing) operation of the first RF transceiver in accordance with the first radio protocol, and kept in the list for use with operating the first RF transceiver. That is, the list may already have been produced prior to receiving or identifying any indication to communicate the data in step 704 of FIG. 7.

For example, the list of noisy RF channels in the first set may have been produced as follows. Each RF channel in the first set is monitored for receipt of an RF signal. A signal quality of the RF signal is then tested to identify whether it meets a predetermined threshold. If the signal quality fails to meet the predetermined threshold, then the RF channel in the list is noisy and marked as "BAD"; otherwise, if the signal quality meets or exceeds the predetermined threshold, the RF channel in the list is clean and marked as "GOOD".

In the present embodiment, the first RF transceiver operates in accordance with the adaptive frequency hopping (AFH) technique of the BLUETOOTH® communication protocol, and the list is part of an interference table that is produced as a result of the AFH technique. Other suitable algorithms or implementations are possible, such as maintaining a list which identifies additional levels of quality of the RF channel (e.g. "GOOD", "OK", and "BAD"; or "EXCELLENT", "GOOD", "OK", and "BAD"; or even using specific signal quality measurements).

In step 708 of FIG. 7, the controller will generally select the RF channel from the second set that is "clean" or has little or no noise, or is the least noisy, based on an examination of the list of noisy RF channels in the first set. For example, the controller may select an RF channel from the second set that overlaps with the least number of noisy RF channels in the first set based on examining the list of noisy RF channels. As another example, the controller may select an RF channel that overlaps with a predetermined number of contiguous, clean RF channels in the first set based on examining the list of noisy RF channels.

The technique for the determination or selection of the RF channel from the second set may be performed in one of a number of different ways. In one embodiment, the controller utilizes a counter or a counting method for counting the number of noisy (or dean) RF channels in each one of a plurality of RF channels from the second set.

For example, the controller may select the RF channel from the second set that is (e.g. first) identified to have a count of noisy RF channels that equals zero. Of course, it is possible that a plurality of RF channels from the second set may be identified to have a count of zero. When there is more than one RF channel from the second set that is identified to be a suitable candidate, additional criteria may be utilized in the selection of the single RF channel from the second set. Clean RF channels may alternatively be counted, where the controller selects the RF channel from the second set that is identified to have a count that equals a predetermined maximum number (e.g. 22 consecutive "clean" BLUETOOTH® channels within an IEEE 802.11 channel).

As another example, the controller may select the RF channel from the second set that is (e.g. first) identified to have a count of noisy RF channels that is less than a predetermined threshold. Of course, it is possible that a plurality of RF channels from the second set may be identified to have a count of noisy channels that is less than a predetermined threshold (e.g. no more than 5 noisy BLUETOOTH® channels within the IEEE 802.11 channel). When there is more than one RF channel from the second set that is identified to be a suitable candidate, additional criteria may be utilized in the selection of the single RF channel from the second set. Clean RF channels may alternatively be counted, where the controller selects the RF channel from the second set that is identified to have a count that is greater than a predetermined threshold (e.g. no less than 18 clean BLUETOOTH® channels within the IEEE 802.11 channel).

In yet another example, the controller may select the RF channel from the second set that is (e.g. first) identified to have a count of noisy RF channels that is less than the count of any other RF channel from the second set. When there is more than one RF channel from the second set that is identified to be a suitable candidate, additional criteria may be utilized in the selection of the single RF channel from the second set. Clean RF channels may alternatively be counted, where the controller selects the RF channel from the second set that is identified to have a count that is greater than the count of any other RF channel from the second set.

In the specific embodiment described, the controller operates to instruct or arrange for the communication of the data with the other communication device by communicating with the other communication device over the first set of RF channels using the first RF transceiver. The controller switches the operational mode as an end terminal to an access point, selects an RF channel of the second set of RF channels as described above, and instructs the other communication device accordingly so that it associates and connects with the access point for communicating the data over this selected RF channel. Again, the communication devices may operate in accordance with IEEE 802.11 CLPP (Configuration and Low Power Profile) and/or IEEE 802.11 AMP (Alternate MAC/PHY) standards for such purpose. Thus, the data may be communicated directly between the communication devices without the data traversing the wireless network infrastructure, where one of the communication devices is set to operate or serve as an access point (switching operation from as an end terminal) and the other communication device operates as an end terminal to associate and connect with the communication device for communications.

Figure 8:
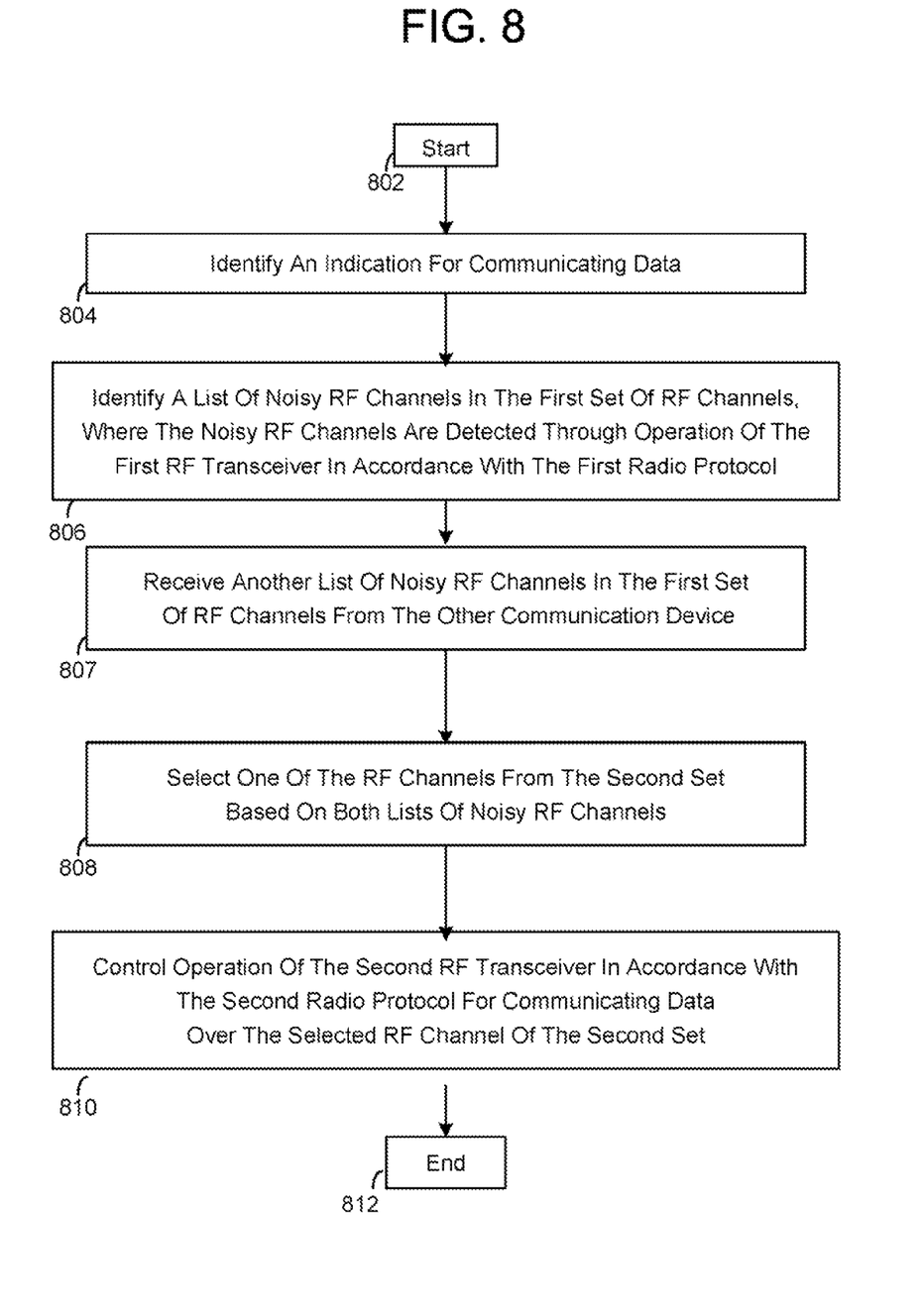
FIG. 8 is a flowchart of another method for use in communicating data, which also includes a technique for selecting an RF channel for the communications.

FIG. 8 is a flowchart of another method for use in communicating data, which includes a technique for selecting an RF channel for communications. The communication device which employs the method is generally configured to operate as an end terminal in a wireless communication network; however, the communication device may switch operation to an access point (AP) mode if desired or necessary. Specifically, the method of FIG. 8 may be performed by mobile device 202 described in relation to FIGS. 1-5. In particular, the techniques described in relation to the flowchart may be performed by one or more controllers or processors of the communication device along with its wireless transceiver. A computer program product which may embody the technique may include a computer readable medium (e.g. memory of the communication device, computer disk, CD-ROM, etc.) having computer instructions stored therein which are executable by the one or more processors of the communication device for performing the technique.

The context of the method of FIG. 8 is the same as described in relation to FIG. 7 above. In addition, the flowchart of FIG. 8 is the same or similar to the flowchart of FIG. 7, where step 804 of FIG. 8 is the same as step 704 of FIG. 7, step 806 of FIG. 8 is the same as step 706 of FIG. 7, and step 810 of FIG. 8 is the same as step 710 of FIG. 7.

On the other hand, step 807 of FIG. 8 is a new step added to the method of FIG. 7. In step 807, the communication device operates to receive a list of noisy channels in the first set from the other communication device. The received list of noisy RF channels in the first set was produced at the other communication device by operating the corresponding first RF transceiver of the other communication device in accordance with the first radio protocol (in the same or similar fashion as described above in relation to the communication device). The list of noisy RF channels from the other communication device may be received by the communication device via its first RF transceiver.

Also note that step 808 of FIG. 8 is similar to step 708 of FIG. 7, except that the controller operates to select an RF channel from the second set based on the list of noisy channels associated with its own first RF transceiver as well as the list of noisy channels of the corresponding RF transceiver of the other communication device. To make such determination, the communication device may perform an examination of both lists of noisy channels. In one embodiment, the controller creates a new or combined list of noisy RF channels which is a union of both lists of noisy RF channels.

Where the noisy channels are listed as merely "GOOD" (e.g. binary "0") or "BAD" (e.g. binary "1"), for example, the union may be performed with use of a logical "OR" operation (where an RF channel in the combined list is marked as noisy if it is deemed noisy in either list). Alternatively, the union of lists may be performed with use of a logical "AND" operation (where an RF channel in the combined list is marked as noisy unless it is deemed GOOD in both lists). The controller may then select/determine the RF channel from the second set in the same manner (e.g. using a counter) as described above in relation to FIG. 7 using the combined list of noisy RF channels.

In an alternative embodiment, the communication device selects the RF channel from the second set based on the list of noisy channels that were received from the other communication device, but not based on any list of its own. Such technique may be suitable where, for example, the other communication device is the (primary) recipient of the data. Such technique may also be suitable where, for example, the communication device does not include the first RF transceiver, but rather, for example, it receives the list of noisy channels in step 807 from the other communication device via the wireless network using the second RF transceiver). In one variation, the communication device may calculate a weighted average depending on the traffic profile distribution, which may require more than just a binary-type (i.e. GOOD or BAD) tagging of RF channels.

In other embodiments, metrics other than noise may be utilized in the selection of the RF channel. In this case, the communication device may select an RF channel from the second set based on a list of channels received from another terminal or network device via the wireless network. As one example, the channels in the list may be selected by the network based on the quality of service (QoS) requirements to be maintained for communications in the wireless network; i.e. the RF channels in the list are selected such that the QoS requirement for communications via the wireless network remains uncompromised or less compromised for other mobile devices.

Although several examples have been provided where the noisy channels are listed as merely "GOOD" or "BAD", other suitable algorithms or implementations are possible such as maintaining a list which identifies additional levels of quality of the RF channel (e.g. "GOOD", "OK", and "BAD"; or "EXCELLENT", "GOOD", "OK", and "BAD"; or even using specific signal quality measurements).

Thus, methods and apparatus for use in communicating data have been described. A mobile communication device includes a first radio frequency (RF) transceiver and a second RF transceiver. The first RF transceiver is operative for communications in accordance with a first radio protocol (e.g. BLUETOOTH®) using a first set of RF channels, and the second RF transceiver is operative for communications in accordance with a second radio protocol (e.g. IEEE 802.11) using a second set of RF channels. The mobile device identifies a list of noisy RF channels in the first set of RF channels, detected through operation of the first RF transceiver in accordance with the first radio protocol. The mobile device selects one of the RF channels from the second set based on the identified list of noisy RF channels. The mobile device then controls operation of the second RF transceiver in accordance with the second radio protocol for communicating data to another communication device over the selected RF channel of the second set.

What is claimed is:

1. A method in a mobile terminal for use in selecting an operating frequency for operation as an access point, the mobile terminal including a first radio frequency (RF) transceiver and a second RF transceiver, the first RF transceiver being operative for communications in accordance with a first radio protocol with use of a first set of RF channel frequencies and the second RF transceiver being operative for communications in accordance with a second radio protocol with use of a second set of RF channel frequencies, the method comprising:

identifying by the mobile terminal a list of noisy RF channel frequencies of the first set of RF channel frequencies, the noisy RF channel frequencies being detected through operation of the first RF transceiver of the mobile terminal in accordance with the first radio protocol;

selecting by the mobile terminal one of the RF channel frequencies from the second set based on the identified list of noisy RF channel frequencies of the first set; and controlling the second RF transceiver of the mobile terminal to operate as an access point in accordance with the second radio protocol with use of the selected RF channel frequency as the operating frequency of the access point.

2. The method of claim 1, wherein the first radio protocol comprises a BLUETOOTH protocol and the second radio protocol comprises an IEEE 802.11 protocol.

3. The method of claim 1, further comprising:

controlling operations of the first RF transceiver for communicating data in accordance with the first radio protocol;

for each RF channel frequency of the first set of RF channel frequencies:

monitoring to receive, in the first RF transceiver, an RF signal over the RF channel frequency;

detecting whether a signal quality of the RF signal meets a predetermined threshold; and producing the list of noisy RF channel frequencies based on the detecting.

4. The method of claim 1, wherein selecting the RF channel frequency from the second set further comprises identifying that the RF channel frequency overlaps with a predetermined number of contiguous, clean RF channel frequencies of the first set of RF channel frequencies based on examining the list of noisy RF channel frequencies.

5. The method of claim 1, wherein selecting the RF channel frequency from the second set further comprises identifying that the RF channel frequency overlaps with the least number of noisy RF channel frequencies in the first set.

6. The method of claim 1, wherein the list of noisy RF channel frequencies comprises a first list of noisy RF channel frequencies, the method further comprises:

receiving, from another mobile terminal, a second list of noisy RF channel frequencies of the first set of RF channel frequencies, the noisy RF channel frequencies of the second list being detected through operation of an RF transceiver of the other mobile terminal in accordance with the first radio protocol; and wherein selecting further comprises selecting the RF channel frequency from the second set based on the first and second lists of noisy RF channel frequencies.

7. The method of claim 1, wherein the list of noisy RF channel frequencies comprises a first list of noisy RF channel frequencies, the method further comprising:

receiving, from another mobile terminal, a second list of noisy RF channel frequencies of the first set of RF channel frequencies, the noisy RF channel frequencies of the second list being detected through operation of an RF transceiver of the other mobile terminal in accordance with the first radio protocol; and wherein selecting further comprises selecting the RF channel frequency the second set based on the first and second lists of noisy RF channel frequencies.

8. The method of claim 1, wherein the first radio protocol comprises a BLUETOOTH protocol and the second radio protocol comprises an IEEE 802.11 protocol, the method further comprising:

controlling operation of the first RF transceiver in accordance with an adaptive frequency hopping (AFH) protocol for producing the list of noisy channel frequencies.

9. The method of claim 1, further comprising:

controlling operation of the first RF transceiver in accordance with an adaptive frequency hopping (AFH) protocol for producing the list of noisy channel frequencies.

10. The method of claim 1, which is embodied as computer instructions stored in memory of the mobile terminal.

11. A mobile terminal, comprising:

a first radio frequency (RF) transceiver operative for communications in accordance with a first radio protocol with use of a first set of RF channel frequencies;

a second RF transceiver operative for communications in accordance with a second radio protocol with use of a second set of RF channel frequencies;

one or more processors coupled to the first and the second RF transceivers;

the one or more processors being configured to select an operating frequency for operation of the mobile terminal as an access point by being further configured to:

identify by the one or more processors a list of noisy RF channel frequencies of the first set of RF channel frequencies, the noisy RF channel frequencies being detected through operation of the first RF transceiver in accordance with the first radio protocol;

select by the one or more processors one of the RF channel frequencies from the second set based on the identified list of noisy RF channel frequencies of the first set; and control the second RF transceiver of the mobile terminal to operate as an access point in accordance with the second radio protocol with use of the selected RF channel frequency as the operating frequency of the access point.

12. The mobile terminal of claim 11, wherein the first radio protocol comprises a BLUETOOTH protocol and the second radio protocol comprises an IEEE 802.11 protocol.

13. The mobile terminal of claim 11, wherein the one or more processors are further configured to:

control operations of the first RF transceiver for communicating data in accordance with the first radio protocol;

for each RE channel frequency in the first set of E channel frequencies:

monitor to receive, in the first. RF transceiver, an RE signal over the RF channel frequency;

detect whether a signal quality of the RF signal meets a predetermined threshold; and produce the list of noisy RE channel frequencies based on the detecting.

14. The mobile terminal of claim 11, wherein the one or more processors are further configured to select the RF channel frequency from the second set by identifying that the RF channel frequency overlaps with a predetermined number of contiguous, clean RF channel frequencies in the first set of RF channel frequencies based on examining the list of noisy RF channel frequencies.

15. The mobile germinal of claim 11, wherein the one or more processors are further configured to select the RF channel frequency from the second set by identifying that the RF channel frequency overlaps with the least number of noisy RF channel frequencies in the first set.

16. The mobile terminal of claim 11, wherein the list of noisy RF channel frequencies comprises a first list of noisy RF channel frequencies, and the one or more processors are further configured to:

receive, from another mobile terminal, a second list of noisy RF channel frequencies of the first set of RF channel frequencies, the noisy RF channel frequencies being detected through operation of an RF transceiver of the other mobile terminal in accordance with the first radio protocol; and the one or more processors being further configured to select the RF channel frequency from the second set based on the identified first and second lists of noisy RF channel frequencies.

17. The mobile terminal of claim 11, wherein the list of noisy RF channel frequencies comprises a first list of noisy RF channel frequencies, and the one or more processors are further configured to:

receive, from another mobile terminal, a second list of noisy RF channel frequencies of the first set of RF channel frequencies, the noisy RF channel frequencies being detected through operation of an RF transceiver of the other mobile terminal in accordance with the first radio protocol; and the one or more processors being further configured to select the RF channel frequency from the second set based on the identified first and second lists of noisy RF channel frequencies.

18. A method in a mobile terminal for use in communicating data with another communication device, the mobile terminal including a first radio frequency (RF) transceiver and a second RF transceiver, the first RF transceiver being operative for communications in accordance with a BLUETOOTH radio protocol with use of a set of BLUETOOTH RF channel frequencies and the second RF transceiver being operative for communications in accordance with an IEEE 802.11 radio protocol with use of a set of IEEE 802.11 RF channel frequencies, the method comprising:

controlling by the mobile terminal operation of the first RF transceiver in accordance with an adaptive frequency hopping (AFH) protocol of the BLUETOOTH radio protocol, thereby producing a channel interference table of BLUETOOTH RF channel frequencies;

identifying at the mobile terminal an indication for communicating data with the other communication device;

selecting by the mobile terminal one of the IEEE 802.11 RF channel frequencies based on the channel interference table of BLUETOOTH RF channel frequencies; and controlling by the mobile terminal operation of the second RF transceiver in accordance with the IEEE 802.11 radio protocol for communicating the data with the other communication device over the selected IEEE 802.11 RF channel frequency.

19. The method of claim 18, wherein the channel interference table of BLUETOOTH RF channel frequencies comprises a first channel interference table, the method further comprising:

receiving, from the other communication device, a second channel interference table of the BLUETOOTH RF channel frequencies, produced by operation of an RF transceiver of the other communication device in accordance with the AFH protocol; and wherein selecting further comprises selecting the IEEE 802.11 RF channel frequency based on of the first and the second channel interference tables.

20. The method of claim 18, wherein controlling operation of the second RF transceiver further comprises controlling the mobile terminal to operate as an access point using the selected IEEE 802.11 RF channel frequency as the operating frequency of the access point.

* * * * *